US006806350B2

(12) United States Patent
Stanek et al.

(10) Patent No.: US 6,806,350 B2
(45) Date of Patent: Oct. 19, 2004

(54) WASHING PROCESS FOR THE PURIFICATION OF POLYMERS CONTAINING N OR AMINO, AMMONIUM OR SPIROBICYCLIC AMMONIUM GROUPS

(75) Inventors: Michael Stanek, Linz (AT); Regina Schitter, Linz (AT); Gerhard Steinbauer, Enns (AT); Gerald Summer, Linz (AT); Peter Hildebrand, Linz (AT)

(73) Assignee: DSM Fine Chemicals Austria Nfg GmbH & Co KG, Linz (AT)

( * ) Notice: Subject to any disclaimer, the term of this patent is extended or adjusted under 35 U.S.C. 154(b) by 0 days.

(21) Appl. No.: 10/362,512

(22) PCT Filed: Aug. 30, 2001

(86) PCT No.: PCT/EP01/09968

§ 371 (c)(1),
(2), (4) Date: Feb. 24, 2003

(87) PCT Pub. No.: WO02/22695

PCT Pub. Date: Mar. 21, 2002

(65) Prior Publication Data

US 2004/0006201 A1 Jan. 8, 2004

(30) Foreign Application Priority Data

Sep. 14, 2000 (AT) ...................................... A 1559/2000

(51) Int. Cl.⁷ .................................................. C08F 6/00

(52) U.S. Cl. ....................... 528/491; 502/104; 502/164; 528/480; 528/484; 528/490

(58) Field of Search ................................ 502/104, 164; 528/480, 484, 490, 491

(56) References Cited

U.S. PATENT DOCUMENTS 6,600,011 B2 * 7/2003 McDonnell et al. ........ 528/480

FOREIGN PATENT DOCUMENTS

| DE | 39 08 803 | 9/1990 |
| WO | 99 33452 | 7/1999 |

* cited by examiner

Primary Examiner—Terressa Boykin
(74) Attorney, Agent, or Firm—Wenderoth, Lind & Ponack L.L.P.

(57) ABSTRACT

The invention relates to a washing process for cleaning polymers containing N or amine, ammonium or spirobicyclic ammonium groups, comprising cationic groups containing N, in addition to suitable counterions, whereby the gelled-out polymers are obtained through polymerization and cross-linking by a) adding a base which is partially or fully deprotonated, b) the partially or fully deprotonated polymers are washed, then c) optionally, are reprotonated in an organic solvent or in an organic solvent/water mixture by adding an acid, whereupon d) optionally, they are washed in an organic solvent or an organic solvent/water mixture in order to shrink the gels and optionally, e) in connection with step c) or d), the steps a)–c) or -d) are repeated.

10 Claims, No Drawings

WASHING PROCESS FOR THE PURIFICATION OF POLYMERS CONTAINING N OR AMINO, AMMONIUM OR SPIROBICYCLIC AMMONIUM GROUPS

The invention relates to a washing process for the purification of polymers containing N or amino, ammonium or spirobicyclic ammonium groups.

Polymers containing N or amino, ammonium or spirobicyclic ammonium groups are polymers having cationic groups and suitable counterions which can optionally contain hydrophobic groups. The cationic groups are in this case derived, for example, from amines or ammonium groups.

Hydrophobic groups are, for example, alkyl side chains or side chains containing N or amine or ammonium groups, which are covalently linked to the polymer network by chemical reaction.

Suitable polymers are already known from the prior art, for example from WO 01/25291, WO 00/32656, WO 00/38664, WO 99/33452, WO 99/22721, WO 98/43653, U.S. Pat. Nos. 5,624,963, 5,496,545 etc.

These polymers are prepared analogously to the prior art, for example by polymerization of the corresponding monomers, the crosslinking being carried out either by addition of the crosslinking reagent to the reaction mixture during the polymerization or following the polymerization reaction. After the appropriate gelling time, the gels obtained are optionally chopped or comminuted and washed. According to the prior art already cited, the washing is carried out by means of water, alcohol or water/alcohol mixtures. The disadvantage of the hitherto customary washing methods lies, as empirical values and experiments showed, on the one hand in the enormously high alcohol consumption and on the other hand in the extremely low throughput, which is to be attributed to the great swelling of the gel during the washing process.

It was accordingly an object of the present invention to find an improved washing method for polymers containing N or amine, ammonium or spirobicyclic ammonium groups, which guarantees a lower alcohol consumption with increased throughput in comparison with the prior art.

Unexpectedly, it was possible to achieve this object by means of a washing process which contains a deprotonation step or one or more deprotonation and reprotonation steps.

The invention accordingly relates to a washing process for the purification of polymers containing N or amine, ammonium or spirobicyclic ammonium groups, comprising cationic N-containing groups, and suitable counterions, which is characterized in that the gelled polymers obtained by polymerization and crosslinking a) [lacuna] partially or completely deprotonated by addition of a base, b) the partially or completely deprotonated polymers are washed, then c) optionally reprotonated in an organic solvent or in an organic solvent/water mixture by addition of an acid, after which d) the mixture is optionally washed with an organic solvent or an organic solvent/water mixture for the shrinkage of the gels and, optionally, e) following step c) or d), steps a) to c) or to d) are repeated.

Polymers containing N or amine, ammonium or spirobicyclic ammonium groups are worked up in the process according to the invention.

These polymers are polymers which are described, for example, in WO 01/25291, WO 00/32656, WO 00/38664, WO 99/33452, WO 99/22721, WO 98/43653, U.S. Pat. Nos. 5,624,963 and 5,496,545.

Cationic polymers, in particular, are suitable for the washing process according to the invention. The cationic polymers include, inter alia, those polymers which contain an amine N atom such as, for example, primary, secondary or tertiary amine groups or salts thereof, quaternary ammonium groups and/or spirobicyclic ammonium groups. Additional cationic groups comprise amidino, guanidino, imino etc.

The cationic polymer is distinguished in that it has a positive charge at physiological pH.

Examples of suitable cationic polymers comprise polyvinylamines, polyallylamines, polydiallylamines, polyvinylimidazoles, polydiallylalkylamines, polyethylenimines, etc, and polymers comprising the repeating units known from, for example, WO 00/32656, page 7f., WO 98/43653, page 4f.; U.S. Pat. No. 5,496,545, column 2 to 4; U.S. Pat. No. 5,624,963; WO 98/29107 etc.

The cationic polymer can optionally be additionally combined with a hydrophobic polymer or a hydrophobic component, such as described, for example, in WO 98/43653, WO 99/33452 or WO 99/22721 etc.

The polymers employed are moreover crosslinked. The crosslinking can in this case be carried out even during the polymerization or else alternatively only following the polymerization. Suitable crosslinking agents comprise the crosslinking agents known from the references already cited. Examples of these are epichlorohydrin, succinyl dichloride, ethylenediamine, toluene diisocyanate, diacrylates, dimethacrylates, methylenebisacrylamides, dichloroethane, dichloropropane, etc.

The polymers employed for the process according to the invention additionally contain negatively charged counterions. These counterions can be organic or inorganic ions or combinations thereof. Suitable counterions likewise comprise the counterions known from the prior art already cited. Examples of suitable inorganic ions are halides, in particular chloride, phosphates, phosphites, carbonates, bicarbonates, sulfates, bisulfates, hydroxides, nitrates, persulfates, sulfites and sulfides. Examples of suitable organic ions are acetates, ascorbates, benzoates, lactate, fumarate, maleate, pyruvate, citrates, dihydrogencitrates, hydrogencitrates, propionate, butyrate, oxalates, succinates, tartrates, cholates etc.

The polymers are prepared according to the prior art, for example as described in WO 99/33452, WO 99/22721, WO 98/43653, U.S. Pat. Nos. 5,624,963 and 5,496,545.

Following the polymerization, crosslinking and gelling time, the work-up according to the invention of the polymers obtained in gel form is carried out. The gel to be purified or to be washed is optionally first of all additionally comminuted or chopped.

The gel is then treated in the first washing step a) at a temperature of 1° C. to 100° C., preferably at 5 to 90° C., particularly preferably at 10 to 40° C., with water, preferably with completely demineralized water (compl. demin. water), or a polar solvent or a mixture and a base suitable for deprotonation. Suitable polar solvents are formamide, dimethylformamide (DMF), acetonitrile, dimethyl sulfoxide (DMSO) and hexamethylphosphoric triamide (HMPT). It is also possible, however, to employ mixtures thereof or mixtures with water. Preferably, however, water is used. Suitable bases are hydroxides, such as, for example, NaOH, KOH, LiOH, Ca(OH)$_2$, NH$_4$OH, carbonates, such as, for example, Na$_2$CO$_3$, K$_2$CO$_3$ etc. Preferably, NaOH, KOH or NH$_4$OH is used.

The amount of base to be used differs greatly from the particular gel, and depends on the amount of counterions and on the degree of deprotonation desired.

The gels can be deprotonated completely or else alternatively only partially.

Per mole of counterions, 0.1 to 5 mol of base, preferably 0.5 to 3 mol and particularly preferably 0.7 to 2 mol of base, are added here. Greater excesses of base can also be employed if desired.

The mixture is then suspended for 1 min to 5 hours, preferably 5 min to 2 hours and particularly preferably 15 minutes to 1.5 hours, preferably with stirring. Longer stirring times are also possible if desired. After settling has been allowed to take place, the supernatant solution is partially to completely filtered off. Filtering off is preferably carried out down to the surface of the gel.

In step b), the suspended gel is washed 1 to 15 times, preferably up to 7 times, with water, preferably with compl. demin. water, or a polar solvent or a mixture, at a temperature from 1° C. to 100° C., preferably at 5 to 90° C., particularly preferably at 10 to 40° C. Suitable polar solvents are in turn formamide, dimethylformamide (DMF), acetonitrile, dimethyl sulfoxide (DMSO) and hexamethylphosphoric triamide (HMPT). It is, however, also possible to employ mixtures thereof or mixtures with water. Preferably, however, water is used. The supernatant solution is in each case filtered off partially to completely, preferably down to the surface of the gel. Optionally, it is possible during step b), for the maintenance of the salt concentration or in order to keep the swelling in the individual washing steps as constant as possible, to add a suitable salt, such as, for example, NaCl, KCl, $NH_4Cl$ or LiCl etc, at the end of each washing, so that an about 0.1 to 5% strength, preferably 0.2 to 2% strength, salt solution results. Owing to the addition of the salt, shrinkage of the gel is achieved, so that it is possible to filter off the washing medium with suction more rapidly.

In step c), the gel is optionally reprotonated in an organic solvent or in an organic solvent/water mixture by addition of an acid.

Suitable organic solvents are in this case linear, branched or cyclic $C_1$–$C_{10}$-alcohols having 1 to 3 OH groups, such as, for example, methanol, ethanol, isopropanol, n-propanol, n-butanol, sec-butanol, hexanol, ethylhexanol, cyclopentanol, cyclohexanol, cyclooctanol, cyclohexanediol, glycol, glycerol etc, and ketones, such as, for example, acetone, methyl ethyl ketone, methyl isopropyl ketone, methyl isobutyl ketone, diisopropyl ketone, cyclohexanone etc, nitriles, such as, for example, acetonitrile etc and ethers, such as, for example, tetrahydrofuran, methyl tert-butyl ether, dimethoxyethane, etc.

Preferably, $C_1$–$C_4$-alcohols are employed, particularly preferably isopropanol.

Organic solvent is understood here as also meaning mixtures of the abovementioned solvents.

Preferably, an organic solvent/water mixture is employed. The ratio of organic solvent to water in this case lies in a range from 1/99 to 99/1, preferably from 30/70 to 95/5 and particularly preferably from 50/50 to 90/10.

Suitable acids for the reprotonation are all mineral acids and organic acids which lead to the counterions already mentioned.

These are, for example, HCl, HBr, $H_2SO_4$, $H_3PO_4$, $HNO_3$ etc, and formic acid, acetic acid, oxalic acid, citric acid, pyruvic acid, maleic acid, fumaric acid, propionic acid, tartaric acid etc.

The amount of acid employed depends on the degree of reprotonation desired, since it is possible to reprotonate the gel completely but also only partially.

The gel is in this case firstly stirred in the organic solvent or the solvent/water mixture. The stirring time is in this case a few minutes to a number of hours, preferably 1 to 60 minutes, particularly preferably for 5 to 30 minutes. Longer stirring times are also possible if desired. The temperature is in turn between 1 and 100° C., preferably 5 to 90° C., particularly preferably 10 to 40° C. The mixture is then treated with that amount of acid which leads to the complete or partial reprotonation of the amines in the polymer. Subsequently, the supernatant solution is again filtered off partially to completely, preferably down to the surface of the gel.

In step d), for the shrinkage of the gel, washing is optionally carried out a further one to 10 times, preferably 1–3 times, using an organic solvent or an organic solvent/water mixture in the ratio 1/99 to 99/1, preferably 30/70 to 95/5 and particularly preferably 50/50 to 90/10.

Finally, the solvent or the solvent/water mixture is filtered off until a pourable product is obtained.

Optionally, following step c) or d), steps a) to c) or d) can be repeated 1 to 5 times, preferably up to 1–3 times.

By means of the process according to the invention, polymers containing N or amine, ammonium or spirobicyclic ammonium groups can be washed with a consumption of organic solvent which is for the most part only ⅕ of the amount customary hitherto, which is significantly lower in comparison with the prior art, with comparatively markedly increased throughput (up to a doubling of the throughput). Furthermore, the washing process according to the invention makes possible a markedly better separation of all impurities and thereby leads, in particular, to a marked reduction of the content of soluble oligomers down into the range of the detection limit (<0.1%).

The process according to the invention is suitable, in particular, for the washing of polymers which are crosslinked and contain cationic N-containing or amine, ammonium or spirobicyclic ammonium groups, and suitable counterions. Preferably the process is employed, however, for the washing of crosslinked polyallylamines and polydiallylamines.

EXAMPLE 1

Preparation of a polydiallylamine hydrochloride crosslinked with epichlorohydrin analogously to the prior art and purification by a washing process according to the invention Polymerization 448.5 g of compl. demin. water and 192.5 g (1.97 mol) of hydrochloric acid (37.4% strength) were introduced into a 1 l Schmizo under a nitrogen atmosphere. 191.0 g (1.97 mol) of diallylamine were added within 15 min at an internal temperature of at most 35° C. with cooling by means of thermocryostats (10° C.). After addition was complete, the pH was adjusted to about 1.9 to 2.0 at 20° C. using hydrochloric acid or diallylamine.

After heating to about 50° C., 2.6 g (0.0096 mol) of V-50 initiator (azodiisobutyramidine dihydrochloride) dissolved in 26.0 g of compl. demin. water were added, the reaction mixture being warmed to 60° C. in the course of 1 hour. After 12 hours, 3.9 g (0.0144 mol) of V-50 initiator dissolved in 36.0 g of compl. demin. water were added again. Once again, 3.9 g of V-50 initiator dissolved in 42.0 g of compl. demin. water were added after 12 hours. The yield of the aqueous approximately 27.5% strength solution of polydiallylamine hydrochloride was 930 g.

Crosslinking 2000 g (4.116 mol) of polydiallylamine hydrochloride solution were introduced into a 4.5 l Schmizo and diluted with 880 g of compl. demin. water with stirring and nitrogen flushing. Subsequently, the mixture was adjusted to a pH between 10.4–10.8 at about 5 to 10° C. using 94 g (1.175 mol) of sodium hydroxide solution (50% strength). The solution obtained was stirred for at least 60 minutes and meanwhile cooled to an internal temperature of 5° C. The reaction mixture was treated with 17.8 g (0.192 mol) of epichlorohydrin, stirred at 5° C. for 30 minutes and subsequently let off into a plastic container to gel. The yield was 100% of theory. After a gelling time of 24 hours, gel particles having an edge length of about 2×2×2 mm were prepared by chopping.

Washing 150 g of chopped gel (parallelepipeds having an edge length of about 2×2×2 mm) were introduced into a sintered glass suction filter (13 cm ∅), treated with 600 g of compl. demin. water and 14 g of NaOH (50% strength), suspended for 30 to 40 minutes with stirring and subsequently filtered off down to the surface after settling had been allowed to take place (about 2 min). Subsequently, the suspended gel was washed once with 600 g of compl. demin. water for 30 minutes with stirring and filtered off down to the surface. The suspended gel was then stirred 5 times for 20 minutes with 600 g each time of compl. demin. water, 3 g of NaCl (about 0.5% strength NaCl solution) being added to each washing step after this stirring time lasting 20 minutes. The mixture was in each case stirred for a further 10 minutes and again filtered off down to the surface. The gel particles were then stirred with 600 g of isopropanol/compl. demin. water (90/10 w/w) for 15 min, after addition of 11.6 ml of concentrated HCl (37.4% strength) the mixture being stirred for a further 20 minutes (until the pH of the wash solution was neutral or slightly basic) and filtered off down to the surface. Subsequently, the gel was stirred twice for 30 minutes with 250 g of isopropanol/compl. demin. water (75/25 w/w) and filtered off until the moist product was pourable. 68 g of moist raw gel having a dry matter content of 34% were obtained.

EXAMPLE 2

Preparation of a polyallylamine hydrochloride crosslinked with epichlorohydrin analogously to the prior art and purification by a washing process according to the invention:

Crosslinking 1500 g (8.02 mol) of an aqueous 50% strength polyallylamine hydrochloride solution (Salsbury Chemicals) were introduced into a 4.5l Schmizo and diluted with 1995 g of compl. demin. water with stirring and nitrogen flushing. Subsequently, the mixture was adjusted to a pH between 10.3–10.6 at 10° C. using 449 g (5.613 mol) of sodium hydroxide solution (50% strength). The solution obtained was stirred for 60 minutes and meanwhile cooled to an internal temperature of 5° C. The reaction mixture was treated with 69.77 g (0.75 mol) of epichlorohydrin, stirred at 5° C. for 30 minutes and subsequently let off into a plastic container to gel. The yield was 100% of theory. After a gelling time of 24 hours, gel particles having an edge length of about 2×2×2 mm were prepared by chopping.

Washing 563 g of chopped gel (parallelepipeds having an edge length of about 2×2×2 mm) were introduced into a sintered glass suction filter (18 cm ∅), treated with 1500 g of compl. demin. water and 27 g of NaOH (50% strength), suspended for 30 to 40 minutes with stirring and subsequently filtered off down to the surface after settling had been allowed to take place (about 2 min). Subsequently, the suspended gel was washed once with 1500 g of compl. demin. water for 30 minutes with stirring and filtered off down to the surface. The suspended gel was then stirred 5 times for 20 minutes with 1500 g each time of compl. demin. water, 7.5 g of NaCl (about 0.5% strength NaCl solution) being added to each washing step after this stirring time lasting 20 minutes. The mixture was in each case stirred for a further 10 minutes and again filtered off down to the surface. The gel particles were then stirred with 1400 g of isopropanol/compl. demin. water (80/20 w/w) for 15 min, after addition of 24 ml of concentrated HCl (37.4% strength) the mixture being stirred for a further 20 minutes (until the pH of the wash solution was neutral or slightly basic) and filtered off down to the surface. Subsequently, the gel was stirred once for 30 minutes with 900 g of isopropanol/compl. demin. water (80/20 w/w) and filtered off until the moist product was pourable. 255 g of moist raw gel having a dry matter content of 35% were obtained.

What is claimed is:

1. A washing process for the purification of polymers containing N or amine, ammonium or spirobicyclic ammonium groups, comprising cationic N-containing groups, and suitable counterions, characterized in that the gelled polymers obtained by polymerization and crosslinking a) [lacuna] partially or completely deprotonated by addition of a base, b) the partially or completely deprotonated polymers are washed, then c) optionally reprotonated in an organic solvent or in an organic solvent/water mixture by addition of an acid, after which d) the mixture is optionally washed with an organic solvent or an organic solvent/water mixture for the shrinkage of the gels and, optionally, e) following step c) or d), steps a) to c) or to d) are repeated.

2. The process as claimed in claim 1, characterized in that the polymers containing N or amine, ammonium or spirobicyclic ammonium groups employed are crosslinked, cationic polymers which contain primary, secondary or tertiary amine groups or salts thereof, quaternary ammonium groups and/or spirobicyclic ammonium groups, amidino groups, guanidino groups or imino groups, and negatively charged inorganic and/or organic counterions from the group consisting of the halides, phosphates, phosphites, carbonates, bicarbonates, sulfates, bisulfates, hydroxides, nitrates, persulfates, sulfites and sulfides, acetates, ascorbates, benzoates, lactates, fumarates, maleates, pyruvates, citrates, dihydrogencitrates, hydrogencitrates, propionates, butyrates, oxalates, succinates, tartrates and cholates, where the cationic polymers can optionally be combined with hydrophobic polymers or components.

3. The process as claimed in claim 1, characterized in that the polymers employed are polyvinylamines, polyallylamines, polydiallylamines, polyvinylimidazoles, polydiallylalkylamines or polyethylenimines having suitable counterions.

4. The process as claimed in claim 1, characterized in that in washing step a) the optionally previously comminuted or chopped gel is treated at a temperature of 1 to 100° C. with water or with a polar solvent from the group consisting of formamide, dimethylformamide, acetonitrile, dimethyl sulfoxide and hexamethylphosphoric triamide or with a mixture thereof or with a mixture with water and a base suitable for deprotonation from the group consisting of NaOH, KOH, LiOH, Ca(OH)$_2$, NH$_4$OH, Na$_2$CO$_3$ and K$_2$CO$_3$, 0.1 to 5 mol of base being added per mole of counterion, the mixture subsequently being suspended for 1 min to 5 hours and, after settling has been allowed to take place, the supernatant solution being partially to completely filtered off.

5. The process as claimed in claim 1, characterized in that in step b), at a temperature from 1° C. to 100° C., the suspended gel is washed 1 to 15 times with water or with a polar solvent from the group consisting of formamide, dimethylformamide, acetonitrile, dimethyl sulfoxide and hexamethylphosphoric triamide or with a mixture thereof or with a mixture with water and in each case the supernatant solution is filtered off partially to completely, it being possible for the maintenance of the salt concentration to add a suitable salt at the end of each washing, so that a 0.1 to 5% strength salt solution is obtained.

6. The process as claimed in claim 1, characterized in that in step c) the organic solvents used are linear, branched or cyclic $C_1$–$C_{10}$-alcohols having 1 to 3 OH groups from the group consisting of methanol, ethanol, isopropanol, n-propanol, n-butanol, sec-butanol, hexanol, ethylhexanol, cyclopentanol, cyclohexanol, cyclooctanol, cyclohexanediol, glycol, glycerol, and ketones from the group consisting of acetone, methyl ethyl ketone, methyl isopropyl ketone, methyl isobutyl ketone, diisopropyl ketone, cyclohexanone, or nitrites and ethers from the group consisting of tetrahydrofuran, methyl tert-butyl ether, dimethoxyethane or mixtures thereof, in the case of solvent/water mixtures the ratio being in a range from 1/99 to 99/1.

7. The process as claimed in claim 1, characterized in that in step c) mineral acids or organic acids are employed for the reprotonation which lead to the counterions originally present in the polymer.

8. The process as claimed in claim 1, characterized in that in step c) the gel is firstly stirred in the organic solvent or the solvent/water mixture for a few minutes up to a number of hours at 1 to 100° C., then treated with that amount of acid which leads to partial to complete reprotonation, after which the supernatant solution is partially to completely filtered off.

9. The process as claimed in claim 1, characterized in that in step d) washing with the organic solvent or the solvent/water mixture is optionally carried out a further 1 to 10 times.

10. The process as claimed in claim 1, characterized in that after completion of the washing process the organic solvent or the solvent/water mixture is filtered off until a pourable product is obtained.

* * * * *